(12) United States Patent
Weiler et al.

(10) Patent No.: US 6,293,373 B1
(45) Date of Patent: Sep. 25, 2001

(54) RETAINING SPRING FOR A HOUSING OF A PARTIALLY LINED DISC BRAKE

(75) Inventors: Rolf Weiler, Eppstein; Elmar Fuchs, Darmstadt; Bernd Langner, Karben, all of (DE)

(73) Assignee: Continental Teves AG & Co, OHG, Frankfurt (DE)

(*) Notice: Subject to any disclaimer, the term of this patent is extended or adjusted under 35 U.S.C. 154(b) by 0 days.

(21) Appl. No.: 09/214,393

(22) PCT Filed: May 7, 1997

(86) PCT No.: PCT/EP97/02359

§ 371 Date: Sep. 17, 1999

§ 102(e) Date: Sep. 17, 1999

(87) PCT Pub. No.: WO98/00651

PCT Pub. Date: Jan. 8, 1998

(30) Foreign Application Priority Data

Jul. 1, 1996 (DE) .................................. 196 26 303

(51) Int. Cl.⁷ .................................................. F16D 65/40
(52) U.S. Cl. .................................. 188/73.38; 188/73.37; 188/250 E
(58) Field of Search ................ 188/73.37, 73.31, 188/73.38, 250 D, 250 E, 250 F, 250 G, 250 B, 71.7, 71.8

(56) References Cited

U.S. PATENT DOCUMENTS

| 4,082,166 | * | 4/1978 | Ritsema ........................... 188/73.6 |
| 4,214,649 | | 7/1980 | Fujimori et al. . |
| 4,296,841 | | 10/1981 | Fujimori et al. . |
| 4,445,595 | * | 5/1984 | Baum ............................... 188/73.38 |
| 4,467,897 | | 8/1984 | Kubo et al. . |
| 4,491,204 | * | 1/1985 | Dirauf et al. ..................... 188/73.38 |
| 4,643,277 | * | 2/1987 | Bangert ............................ 188/1.11 |
| 4,805,745 | * | 2/1989 | Thiel ............................... 188/73.31 |
| 4,807,726 | * | 2/1989 | Tickle et al. ..................... 188/73.32 |
| 4,881,623 | | 11/1989 | Kondo . |
| 4,901,825 | * | 2/1990 | Weller ............................. 188/73.35 |
| 5,067,594 | * | 11/1991 | Leidecker et al. ............... 188/73.35 |
| 5,113,978 | * | 5/1992 | Weiler et al. .................... 188/73.31 |
| 5,613,579 | * | 3/1997 | Moore ............................. 188/244 |
| 5,687,817 | * | 11/1997 | Kobayashi et al. .............. 188/72.3 |
| 5,727,659 | * | 3/1998 | Brown et al. .................... 188/73.36 |
| 6,003,642 | * | 12/1999 | Mori et al. ....................... 188/73.4 |

FOREIGN PATENT DOCUMENTS

| 29 37 149 | 3/1980 | (DE) . |
| 28 45 959 | 4/1980 | (DE) . |
| 32 31 176 | 2/1984 | (DE) . |
| 33 36 302 | 4/1985 | (DE) . |
| 39 08 741 | 9/1990 | (DE) . |
| 40 24 484 | 2/1992 | (DE) . |
| 41 01 599 | 7/1992 | (DE) . |
| 43 31 633 | 3/1995 | (DE) . |
| 195 05 113 | 8/1996 | (DE) . |

* cited by examiner

Primary Examiner—Robert J. Oberleitner
Assistant Examiner—Benjamin A. Pezzlo
(74) Attorney, Agent, or Firm—Rader, Fishman & Grauer PLLC

(57) ABSTRACT

The present invention relates to a retaining spring for a housing of a spot-type disc brake, especially an integrated disc brake for motor vehicles, in which a brake carrier of the disc brake is integrated in the steering knuckle of the vehicle, the retaining spring including at least one spring arm extending essentially in circumferential direction and clamping the housing and the brake carrier in relation to each other. In order to install the housing retaining spring in a pre-assembled state on the brake housing without further processing and to fix the outer lining in the foreseen position the present invention teaches attaching the housing retaining spring on a part of the disc brake, especially on the outer brake lining in a swiveling manner.

9 Claims, 2 Drawing Sheets

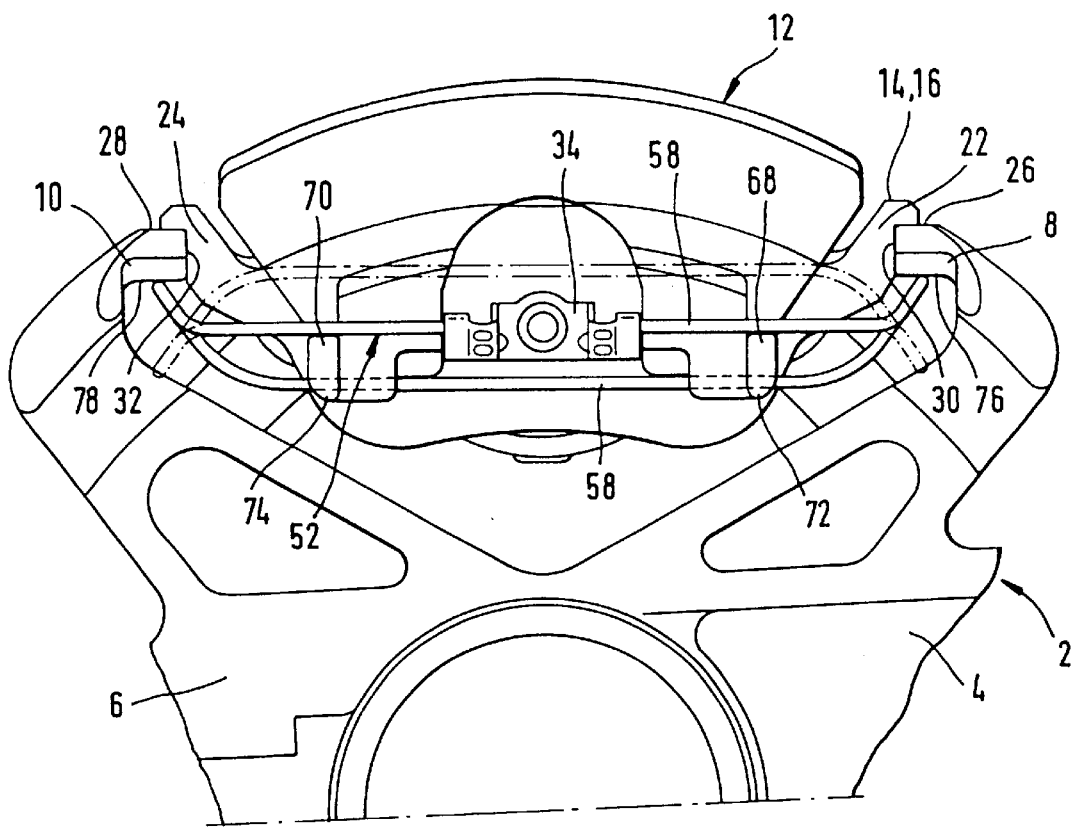
Fig. 1
Fig. 2
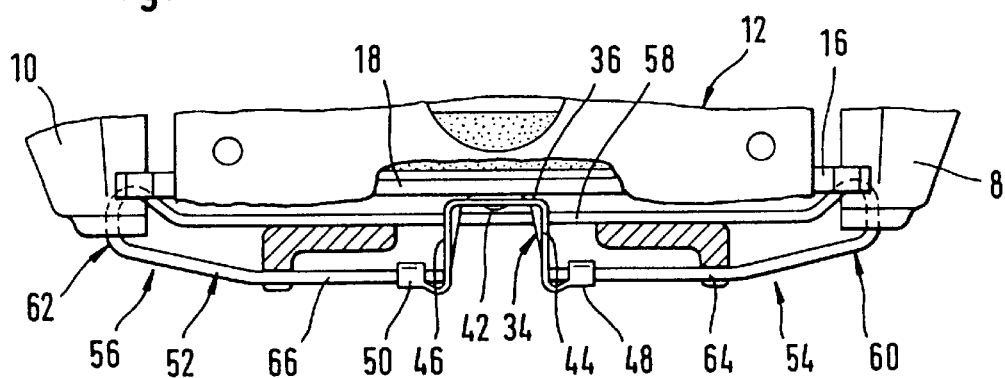

RETAINING SPRING FOR A HOUSING OF A PARTIALLY LINED DISC BRAKE

TECHNICAL FIELD

The present invention relates to a retaining spring for a housing of a spot-type disc brake, in particular an integrated disc brake for motor vehicles, which integrates a brake carrier of the disc brakes in the steering knuckle of the vehicle and includes at least one spring arm extending substantially in circumferential direction and clamping the housing and the brake carrier in relation to each other.

BACKGROUND OF THE INVENTION

DE3336302 A1 already discloses a retaining spring for a housing of a spot-type disc brake being provided with a leg extending approximately tangentially to the brake disc and parallel to the back plate of a brake lining, the free end of such leg abutting resiliently on one of two support members of the brake carrier, the retaining spring including at least one arm being rigidly coupled with the back plate of the brake lining. The retaining spring is formed of one single wire section and is T-shaped, the lower end of the radially extending arm of the spring close to the axis of the brake disc being provided with a leg abutting on the support member and extending furthermore parallel to the two arms which are connected with the upper end of the radial arm and support the brake caliper, and having such a length that it projects beyond the free end of the spring arm.

DE4024484 A1 further discloses a floating caliper for a spot-type disc brake, in particular a fist-type caliper brake, being supported in an axially displaceable manner on a brake carrier and clamped against the brake carrier by means of a housing retaining spring, which is attached to the axially outer leg of the float-type caliper remote from the actuating unit and includes spring arms extending essentially towards the brake disc, the spring arms pushing against the brake carrier in radial direction and being displaceable relatively thereto in axial direction and the outer leg including at least one projection on its open end on which the housing retaining spring is locked by snapping in against axial displacements in relation to the float-type caliper. The housing retaining spring also includes two fastening arms which are bent with regard to the center part and are hooked in openings of the axially outer leg of the float-type caliper with their bent ends.

It is the object of the present invention to create a generic retaining spring which does not need any further processing in order to be fastened to the brake housing and can be pre-assembled when attached to the caliper, fixing at the same time the outer brake lining in the foreseen position, so that the caliper can be transported without presenting loose parts.

This object is obtained by the present invention in that the retaining spring is attached to a part of the disc brake, in particular to the outer brake lining, in a swiveling manner.

With the solution according to the present invention it is obtained in a simple manner that no further processing is necessary for accommodating the spring on the housing. The necessary supports can be cast into the caliper housing. Another advantage of the present invention is that the retaining spring can be attached to the caliper being already pre-assembled and that it fixes the outer lining in the foreseen position so that the caliper can be transported without presenting loose parts. During the final assembly the housing retaining spring is swiveled around its axis of rotation and locked. The retaining spring according to the present invention is especially suitable for integrated disc brakes which integrate the brake carrier of the disc brake in the steering knuckle of the vehicle.

An advantageous embodiment of the present invention foresees that the spring arm, particularly with an end section, abuts on lining carrier arms formed by the brake carrier.

Another advantageous embodiment of the invention foresees a retaining element made of sheet metal (among other materials) for retaining the spring on the brake lining.

According to another advantageous embodiment the retaining element forms a U-shaped fastening member including a fastening section for fastening the retaining element on the brake lining.

The retaining element includes advantageously at least one retaining arm holding one free end in the housing retaining spring in a swiveling manner.

BRIEF DESCRIPTION OF THE DRAWINGS

FIG. 1 is a front view of a spot-type disc brake.

FIG. 2 is a partial top view of the disc brake shown in FIG. 1.

DETAILED DESCRIPTION OF THE PREFERRED EMBODIMENTS

Figure 3:
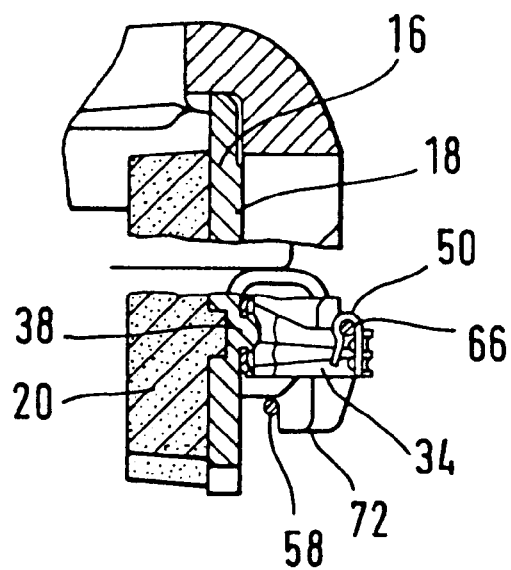
FIG. 3 is a section through the outer leg of the disc brake shown in FIGS. 1 and 2.

The spot-type disc brake according to the present invention is of an integrated type in which the brake carrier 2 is integrated in the steering knuckle 4 of a vehicle. The brake carrier 2 includes a section 6 extending essentially parallel to a brake disc (not shown) as well as two brake carrier arms 8, 10 extending parallel to the axis of the brake disc and protruding beyond its border. A brake housing 12 is supported axially displaceable on brake carrier 2, embracing the outer border of the brake disc and two brake linings 14, 16 arranged on both sides of the brake disc. An actuating unit (not shown) is arranged in the brake housing with which the inner brake lining 14 can be pushed against the brake disc so that the brake housing 12 is displaced in the opposite direction pushing also the outer brake lining 16 against the brake disc.

The brake linings 14, 16 include each a back plate 18 and a friction element 20 attached to it. The back plates 18 of the brake linings form ends 22, 24 which support and guide the brake linings in the carrier arms 8, 10. The brake carrier arms 8, 10 form resp. two bearing surfaces 26, 28 and abutment surfaces 30, 32 which are angled in relation to each other.

A retaining element 34 is fixed on the back plate 18 of the outer brake lining 16. This retaining element 34 is made of sheet metal and is essentially U-shaped. The basis 36 of the U serves for fixing the retaining element on the back plate 18. For this reason a projection 38 is formed on the back plate extending through an opening of the retaining element 34 and forming a rivet head, if fastened. From the basis 36 two legs 44, 46 extend essentially perpendicular to the back plate. Retaining aims 48, 50 are formed at the ends of the legs 44, 46. These retaining arms 48, 50 are bent like a U providing thus fixing elements for the housing retaining spring 52.

The housing retaining spring 52 is bent integrally from a piece of wire forming two spring arms 54, 56 extending in tangential direction. The housing retaining spring 52 includes a center element 58 being formed essentially straight in the area of the outer leg of the brake housing and being bent in the protruding areas approximately at an angle of 45 degrees with regard to the brake carrier arms 8, 10. The end pieces 60, 62 of the housing retaining spring 52 are formed below the brake carrier arms 8, 10. For this reason a short piece of the spring extends parallel to the brake carrier arms 8,10 merging then into free ends 64, 66 extending essentially tangential. The free ends 64, 66 are embraced by the supports of the retaining arms 48, 50, as is particularly shown in FIG. 3. The fastening is done in such a way that the housing retaining spring 52 with its free ends 64, 66 can be snapped into the retaining arms 48, 50 and after that is retained in a swiveling manner. In the assembled state which is shown particularly in FIGS. 1 and 2, the free ends 64, 66 abut on projections 68, 70 provided on the upper side of the brake housing 12, while the center part 58 of the housing retaining spring engages under the lugs 72, 74 formed by projections 68, 70. The end pieces 60, 62 of the housing retaining spring abut on the abutment surfaces 76, 78 of the brake carrier arms 8, 10.

Figure 4:
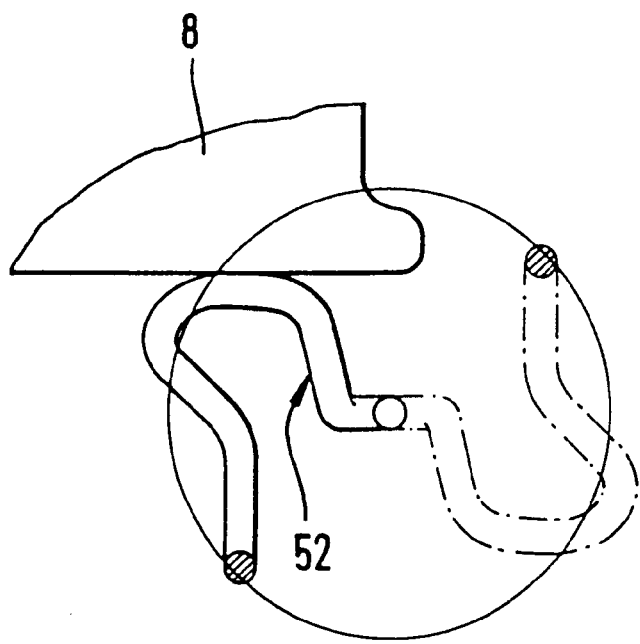
FIG. 4 is a basic representation of the housing retaining spring in a pre-assembled state and in the final assembled state.

By this way of fastening the housing retaining spring 52 is retained on the caliper in a pre-assembled state being able to fix also the outer lining in the foreseen positions so that the brake housing can be transported without presenting loose parts. During the final assembly the housing retaining spring is swiveled around its axis of rotation formed by the free ends 64, 66 so that the end pieces 60, 62 of the housing retaining spring abut on the abutment surfaces 76, 78 of the brake carrier arms 8, 10. In FIGS. 1 and 4 the pre-assembled position of the housing retaining spring 52 is represented by a dashed line, while the final assembled state is shown with full lines.

What is claimed is:

1. Retaining spring for a housing of a spot-type disk brake, comprising:

a brake carrier for carrying a disc brake integrated in a steering knuckle, a retaining spring including at least one spring arm extending essentially in circumferential direction, wherein the retaining spring is attached in a swiveling manner to one part of the disc brake, wherein a retaining element forms a U-shaped fastening member with a fastening section for fastening the retaining element on the brake lining.

2. Retaining spring assembly according to claim 1, wherein the spring arm abuts on a brake carrier ann formed by the brake carrier.

3. Retaining spring assembly, according to claim 1, further wherein the retaining element is, made of sheet metal for supporting the housing retaining spring on the brake lining.

4. Retaining spring assembly according to claim 3, wherein the retaining element forms at least one retaining arm supporting a free end of the housing retaining spring in a swiveling manner.

5. Retaining spring assembly according to claim 1, wherein the retaining spring abuts projections formed on the brake housing.

6. Retaining spring for a housing of a spot-type disk brake, comprising:

a brake carrier for carrying a disc brake integrated in a steering knuckle, a retaining spring including at least one spring arm extending essentially in circumferential direction, wherein the retaining spring is attached in a swiveling manner to one part of the disc brake, wherein a retaining element forms at least one retaining arm supporting a free end of the housing retaining spring in a swiveling manner.

7. Retaining spring assembly according to claim 6, wherein the spring arm abuts on a brake carrier arm formed by the brake carrier.

8. Retaining spring assembly according to claim 6, wherein the retaining element is, made of sheet metal for supporting the housing retaining spring on the brake lining.

9. Retaining spring assembly according to claim 6, wherein the retaining spring abuts projections formed on the brake housing.

* * * * *

UNITED STATES PATENT AND TRADEMARK OFFICE
CERTIFICATE OF CORRECTION

PATENT NO.    : 6,293,373 B1
DATED         : September 25, 2001
INVENTOR(S)   : Rolf Weiler, Elmar Fuchs and Bernd Langner It is certified that error appears in the above-identified patent and that said Letters Patent is hereby corrected as shown below:

<u>Column 4,</u>
Line 7, change "carrier ann formed" to -- carrier arm formed --.

Signed and Sealed this

Eleventh Day of June, 2002

*Attest:*

*Attesting Officer*

JAMES E. ROGAN
*Director of the United States Patent and Trademark Office*